(12) United States Patent
Takashima et al.

(10) Patent No.: US 11,236,406 B2
(45) Date of Patent: Feb. 1, 2022

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Tokyo (JP)

(72) Inventors: Katsutoshi Takashima, Tokyo (JP); Takashi Kobayashi, Tokyo (JP); Yoshimasa Funakawa, Tokyo (JP); Seiji Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 277 days.

(21) Appl. No.: 16/620,615

(22) PCT Filed: Mar. 30, 2018

(86) PCT No.: PCT/JP2018/013725
§ 371 (c)(1),
(2) Date: Dec. 9, 2019

(87) PCT Pub. No.: WO2019/003542
PCT Pub. Date: Jan. 3, 2019

(65) Prior Publication Data
US 2020/0370140 A1 Nov. 26, 2020

(30) Foreign Application Priority Data

Jun. 30, 2017 (WO) .................. PCT/JP2017/024260

(51) Int. Cl.
| | | |
|---|---|---|
| *C21D 9/46* | (2006.01) | |
| *B21D 22/02* | (2006.01) | |
| *B32B 15/01* | (2006.01) | |
| *C21D 1/18* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/10* | (2006.01) | |
| *C22C 38/16* | (2006.01) | |
| *C22C 38/26* | (2006.01) | |
| *C22C 38/28* | (2006.01) | |
| *C22C 38/32* | (2006.01) | |
| *C23C 30/00* | (2006.01) | |

(52) U.S. Cl.
CPC .............. *C21D 9/46* (2013.01); *B21D 22/022* (2013.01); *B32B 15/012* (2013.01); *B32B 15/013* (2013.01); *C21D 1/18* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/105* (2013.01); *C22C 38/16* (2013.01); *C22C 38/26* (2013.01); *C22C 38/28* (2013.01); *C22C 38/32* (2013.01); *C23C 30/005* (2013.01); *C21D 2211/004* (2013.01); *C21D 2211/008* (2013.01)

(58) Field of Classification Search
None
See application file for complete search history.

(56) References Cited

U.S. PATENT DOCUMENTS

| 9,725,782 B2* | 8/2017 | Nonaka ................... C21D 9/46 |
| 10,174,396 B2 | 1/2019 | Takashima et al. |
| 2013/0095347 A1* | 4/2013 | Kawasaki ............... B21B 1/026 |
| | | 428/684 |
| 2017/0029913 A1 | 2/2017 | Bae et al. |

FOREIGN PATENT DOCUMENTS

| CN | 101713046 A | 5/2010 |
| CN | 104508163 A | 4/2015 |
| CN | 105940134 A | 9/2016 |
| EP | 2581465 A1 | 4/2013 |
| EP | 2803746 A1 | 11/2014 |
| EP | 2881481 A1 | 6/2015 |

(Continued)

OTHER PUBLICATIONS

Jul. 3, 2018, International Search Report issued in the International Patent Application No. PCT/JP2018/013725.
Mar. 10, 2020, the Extended European Search Report issued by the European Patent Office in the corresponding European Patent Application No. 18825409.8.
Dec. 18, 2020, Office Action issued by the China National Intellectual Property Administration in the corresponding Chinese Patent Application No. 201880042603.4 with English language search report.

(Continued)

*Primary Examiner* — Daniel J. Schleis
(74) *Attorney, Agent, or Firm* — Kenja IP Law PC

(57) ABSTRACT

Disclosed is a hot-pressed member that can exhibit very high tensile strength after hot pressing as high as TS: 1780 MPa or more, and excellent indentation peeling strength at projection welds by properly adjusting its chemical composition and its microstructure such that a prior austenite average grain size is 7 μm or less within a range of 50 μm or less in a thickness direction from a surface of the member, a volume fraction of martensite is 90% or more, and an average intergrain distance of Nb and Ti carbonitrides having a grain size of less than 0.10 μm within a depth range of 20 μm to 100 μm in the thickness direction from the surface of the member is 5 μm or less.

16 Claims, No Drawings

(56) References Cited

FOREIGN PATENT DOCUMENTS

| | | | |
|---|---|---|---|
| JP | 2001303186 | A | 10/2001 |
| JP | 2007314817 | A | 12/2007 |
| JP | 2010065295 | A | 3/2010 |
| JP | 4464861 | B2 | 5/2010 |
| JP | 2010174282 | A | 8/2010 |
| JP | 2010174283 | A | 8/2010 |
| JP | 2010215954 | A | 9/2010 |
| JP | 2012126943 | A | 7/2012 |
| JP | 2012157900 | A | 8/2012 |
| JP | 2012179646 | A | 9/2012 |

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of nut projection weldability of a hot-pressed member.

As used herein, the term "hot-pressed member" refers to a member obtained by hot press forming a cold-rolled steel sheet having quench hardenability to increase its strength.

In addition, examples of the cold-rolled steel sheet disclosed herein include not only general cold-rolled steel sheets, but also hot-dip galvanized cold-rolled steel sheets (including galvannealed cold-rolled steel sheets), electrogalvanized cold-rolled steel sheets (including zinc-nickel alloy-electroplated cold-rolled steel sheets), and aluminum-coated or aluminum-plated cold-rolled steel sheets.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

On the other hand, high-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming.

However, although many automobile assembly processes are accomplished by resistance spot welding, in part, assembly is achieved by bolting where a gun of a resistance spot welding machine can not enter. In this case, a nut having projection parts is resistance-welded to a steel sheet, which in turn is assembled with another steel sheet using a bolt. However, in order to secure a tensile strength of 1780 MPa or more, it is necessary to contain a large amount of alloying elements (for example, C), which would lead to a significant reduction in the indentation peeling strength at the projection welds (welded joints) between the nut and the steel sheet.

Conventionally, several means for improving nut projection weldability have been reported.

For example, JP2012-157900A (PTL 1) describes a technique for improving the indentation peeling strength by controlling the welding conditions.

In addition, JP2012-126943A (PTL 2) describes a technique for improving the indentation peeling strength by controlling the concentration of solute Si and the concentration of solute Al on a surface of a steel sheet.

CITATION LIST

Patent Literature

PTL 1: JP2012-157900A
PTL 2: JP2012-126943A

SUMMARY

Technical Problem

However, in the technique of PTL 1 for controlling the welding conditions, in addition to the limitation on the welding machine, a control timer or the like is required, which increases the cost. Furthermore, even if applied to a steel sheet having a tensile strength of 1780 MPa or more, the improvement in indentation peeling strength is insufficient.

Further, the technique of PTL 2 is directed to a steel sheet having a tensile strength of about 1000 MPa, and in this component range, melting occurs between the nut and the steel sheet in resistance welding and a nugget is formed. However, in the case of steel sheet components achieving a tensile strength of more than 1780 MPa, deformation resistance is increased, and welding is accomplished by crimping, rather than welding which forms nuggets. Therefore, in such a case, the technique of PTL 2 can not be expected to improve the indentation peeling strength.

As described above, it is considered difficult to improve, regardless of the welding conditions, the indentation peeling strength of a hot-pressed member having TS of 1780 MPa or more after being subjected to projection welding with a nut, and a hot-pressed member showing improvement in both of these properties has not been developed.

Solution to Problem

Therefore, as a result of intensive investigations in view of the above situation, the present inventors discovered that in order to improve the indentation peeling strength of a hot-pressed member after being subjected to projection welding with a nut, it is effective to finely disperse Nb or Ti carbonitrides within a depth range of 20 μm to 100 μm in a thickness direction of the member from a surface of the member, which makes it possible to refine the prior austenite grain size after welding, to improve the toughness, and thus to improve the indentation peeling strength of the nut after projection welding.

In addition, as described above, since deformation resistance is high in steel components achieving a tensile strength of 1780 MPa or more, except for the outermost surface layer of the hot-pressed member, welding is accomplished in such a way that like upset welding, only the projection parts of a nut and the outermost surface layer of the member are melted and welded by crimping, instead of a welding like resistance spot welding in which welding is achieved as a result of the member being melted to form a nugget. At this time, the outermost surface layer of the member is melted, repelled from the member surface, and welded on a newlyformed surface to provide another member. After that, the member is tightened with a bolt, and the peeling strength (indentation peeling strength) when pressing the bolt is important. Therefore, as a result of further intensive studies, the inventors discovered that a microstructure in a range of 20 μm to 100 μm in the thickness direction from the surface of the member after being subjected to hot pressing strongly influences the indentation peeling strength.

Specifically, by dispersing fine Nb or Ti carbonitrides within a depth range of 20 μm to 100 μm from the surface of the member, the prior austenite average grain size becomes finer, strengthening by precipitation of Nb and Ti carbonitrides improves the yield strength, and thus the indentation peel strength is improved.

The present disclosure was completed based on the above discoveries.

Specifically, primary features of the present disclosure are as follows.

1. A hot-pressed member comprising: a steel chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities; a microstructure in which a prior austenite average grain size is 7 μm or less within a range of 50 μm or less in a thickness direction from a surface of the member, a volume fraction of martensite is 90% or more, an average intergrain distance of Nb and Ti carbonitrides having a grain size of less than 0.10 μm within a depth range of 20 μm to 100 μm in the thickness direction from the surface of the member is 5 μm or less; and a tensile strength of 1780 MPa or more.

2. The hot-pressed member according to 1., wherein the steel chemical composition further contains, by mass %, at least one selected from the group consisting of B: 0.0050% or less, Mo: 0.50% or less, Cr: 0.50% or less, Sb: 0.001% or more and 0.020% or less, Ca: 0.005% or less, Mg: 0.005 or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to 1. or 2., comprising, on a surface layer thereof, an Al or Al alloy coating or plating layer or a Zn or Zn alloy coating or plating layer.

4. A cold-rolled steel sheet for hot pressing, comprising: a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities; and a microstructure which contains 30% or less by volume fraction of pearlite, and in which at least 10 Nb and Ti carbonitrides having a grain size of less than 0.10 μm are present on average per 100 μm² of a cross section parallel to a thickness direction of the steel sheet within a range of 150 μm in the thickness direction from the surface of the steel sheet, and the Nb and Ti carbonitrides have an average intergrain distance of 5 μm or less.

5. The cold-rolled steel sheet for hot pressing according to 4., wherein the chemical composition further contains, by mass %, at least one selected from B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

6. The cold-rolled steel sheet for hot pressing according to 4. or 5., wherein the steel sheet comprises on a surface thereof an Al or Al alloy coating or plating layer or a Zn or Zn alloy coating or plating layer.

7. A method for manufacturing the cold-rolled steel sheet for hot pressing as recited in 4., the method comprising: preparing a steel raw material comprising a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities; hot rolling the steel raw material to obtain a hot-rolled steel sheet under a condition of a finisher delivery temperature of 860° C. to 950° C., the hot rolling being started after heating of the steel raw material for 30 minutes or longer at a temperature of 1200° C. or higher; after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature; after the primary cooling, subjecting the steel sheet to secondary cooling whereby the steel sheet is coiled at a coiling temperature of 500° C. or lower at a second average cooling rate of 5° C./s to 50° C./s up to the coiling temperature; then pickling and cold rolling the coiled hot-rolled steel sheet to obtain a cold-rolled steel sheet, and then subjecting the cold-rolled steel sheet to a first annealing whereby the cold-rolled steel sheet is held for 600 seconds or shorter in a temperature range of 850° C. to 950° C. as a soaking temperature, then cooled to room temperature by water cooling, and subjected to 60 seconds to 1800 seconds of tempering in a temperature range of 150° C. to 300° C.; and after the first annealing, subjecting the steel sheet to a second annealing whereby the steel sheet is heated to a temperature range of 720° C. to 850° C. at an average heating rate of 3° C./s to 30° C./s, held for 15 seconds or longer in a temperature range of 720° C. to 850° C. as a soaking temperature, and cooled to a cooling end temperature of 600° C. or lower at a third average cooling rate of 5° C./s or higher.

8. The method for manufacturing the cold-rolled steel sheet for hot pressing according to 7., wherein the chemical composition further contains, by mass %, at least one selected from the group consisting of B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

9. The method for manufacturing the cold-rolled steel sheet for hot pressing according to 7. or 8., the method further comprising: after the second annealing, applying an Al or Al alloy coating or plating treatment or a Zn or Zn alloy coating or plating treatment to a surface of the cold-rolled steel sheet.

10. A method for manufacturing a hot-pressed member, comprising: heating the cold-rolled steel sheet for hot pressing as recited in any one of 4. to 6. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent nut projection weldability. For example, it is possible to stably obtain a hot-pressed member excellent in nut projection weldability having a tensile strength of 1780 MPa or more and an indentation peeling strength of 6.5 kN or more (preferably 8 kN or more) after welding an M6 nut.

Further, according to the present disclosure, it is possible to obtain a hot-pressed member with stable properties even under hot pressing conditions with large variations at the time of heating.

DETAILED DESCRIPTION

The following provides the details of the present disclosure. First, the microstructures of the hot-pressed member and the cold-rolled steel sheet for hot pressing according to the present disclosure will be described in detail.

[Microstructure of Hot-Pressed Member]

The microstructure of the hot-pressed member is a microstructure in which a prior austenite average grain size is 7 μm or less within a range of 50 μm or less in a thickness direction from a surface of the member, a volume fraction of martensite is 90% or more, and an average intergrain distance of Nb and Ti carbonitrides having a grain size of less than 0.10 μm within a depth range of 20 μm to 100 μm in the thickness direction from the surface of the member is 5 μm or less.

If the prior austenite average crystal grain size within a range of 50 μm in the thickness direction from the surface of the member is more than 7 μm, the toughness deteriorates and the indentation peeling strength after projection welding decreases. Therefore, the upper limit of the prior austenite average crystal grain size is 7 μm. It is preferably 6 μm or less, and more preferably 5.5 μm or less.

In addition, when the volume fraction of martensite is less than 90% within a range of 50 μm in the thickness direction from the surface of the member, it is difficult to achieve a tensile strength of 1780 MPa or more. Therefore, the volume fraction of martensite within a range of 50 μm in the thickness direction from the surface of the member is 90% or more. It is preferably 93% or more, and more preferably 95% or more. It may be 100%.

The residual microstructures include ferrite, bainite, pearlite, and the like, and a total content of 4% or less is allowable.

Further, in the present disclosure, in a cross section parallel to the thickness direction of the member after being subjected to hot pressing, an average intergrain distance of Nb and Ti carbonitrides having a grain size of less than 0.10 μm within a depth range of 20 μm to 100 μm in the thickness direction from the surface of the member should be 5 μm or less, and preferably 4 μm or less. By dispersing such fine Nb and Ti carbonitrides, the toughness in the vicinity of the interface between the nut and the member after being subjected to projection welding is improved, and the indentation peeling strength is improved. The intergrain distances to be secured in the disclosure include all of the following: the intergrain distance between adjacent Nb carbonitrides, the intergrain distance between adjacent Ti carbonitrides, and the intergrain distance between adjacent Nb and Ti carbonitrides.

The cross section parallel to the thickness direction of the member to be measured is not particularly limited, and may be taken at any position.

Here, examples of Nb carbonitrides include NbC, NbN, Nb(C,N), and the like, and examples of Ti carbonitrides include TiC, TiN, Ti(C,N), and the like.

[Microstructure of Cold-Rolled Steel Sheet for Hot Pressing]

In order to obtain desired properties as a hot pressed member, it is important to control the microstructure of the cold-rolled steel sheet for hot pressing. That is, the microstructure of the cold-rolled steel sheet for hot pressing is a microstructure which contains 30% or less by volume fraction of pearlite, and in which at least 10 Nb and Ti carbonitrides having a grain size of less than 0.10 μm are present on average per 100 μm$^2$ of a cross section parallel to a thickness direction of the steel sheet within a range of 150 μm in the thickness direction from the surface of the steel sheet, and the Nb and Ti carbonitrides have an average intergrain distance of 5 μm or less.

In the cold-rolled steel sheet for hot pressing, when the volume fraction of pearlite exceeds 30%, the average intergrain distance of Nb and Ti carbonitrides having a grain size of less than 0.10 μm within a range of 150 μm in the thickness direction from the surface of the steel sheet exceeds 5 μm, resulting in a lower indentation peeling strength after projection welding. This is because pearlite contains precipitated cementite which is composed of Fe and C, and the amount of C to be bonded with Nb or Ti becomes insufficient. The volume fraction of pearlite is preferably 25% or less, and more preferably 20% or less. The lower limit of the volume ratio of pearlite is preferably 1%.

The residual microstructures of the cold-rolled steel sheet for hot pressing include, for example, ferrite and martensite, and a ferrite content of 30% to 90% and a martensite content of 1% to 50% are allowable, respectively.

There are also Nb and Ti carbonitrides which are coarsened by hot pressing. Thus, if the number of Nb and Ti carbonitrides having a grain size of less than 0.10 μm within a range of 150 μm in the thickness direction from the surface of the steel sheet is less than 10 on average per 100 μm$^2$ of a cross section parallel to the thickness direction of the steel sheet, the desired Nb and Ti carbonitrides distribution pattern can not be obtained after hot pressing, resulting in a lower indentation peeling strength after projection welding. Therefore, in the cold-rolled steel sheet before being subjected to hot pressing, the number of Nb and Ti carbonitrides having a grain size of less than 0.10 μm within a range from 150 μm in the thickness direction from the surface of the steel sheet is at least 10, preferably at least 15, on average per 100 μm$^2$ of a cross section parallel to the thickness direction of the steel sheet. In addition, no particular limitation is placed on the cross section parallel to the thickness direction of the steel sheet to be measured, and a so-called C or L cross section may be used.

Furthermore, in order to obtain the desired prior austenite grain size after hot pressing, it is preferable that the microstructure of the cold-rolled steel sheet before being subjected to hot pressing contains 20% or more by volume fraction of ferrite having an average grain size of 7 μm or less. A preferred upper limit of this volume fraction is 85%. The reason is that C and Mn are concentrated in hard phases other than ferrite, and a desired prior austenite grain size can not be obtained on the surface layer of the member after being subjected to hot pressing.

In the cold rolled steel sheet for hot pressing, the requirement that the content of pearlite be in the range of 30% or less by volume fraction is mainly satisfied by the cooling step and the second annealing step after the hot rolling during the manufacturing process of a cold-rolled steel sheet described later. In addition, the requirement that at least 10 Nb and Ti carbonitrides having a grain size of less than 0.10 µm be present on average per 100 µm² of a cross section parallel to the thickness direction of the steel sheet within a range of 150 µm in the thickness direction from the surface of the steel sheet, and that the intergrain distance of the Nb and Ti carbonitrides be 5 µm or less is mainly satisfied by the hot rolling step and the first and second annealing steps.

Next, appropriate compositions of the hot-pressed member and the cold-rolled steel sheet for hot pressing according to the present disclosure will be described. When components are expressed in "%", this refers to "mass %".

C: 0.28% or more and less than 0.42%

C is an element effective for increasing the strength of the steel sheet, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness of the member in the vicinity of the interface between the nut and the steel sheet after projection welding increases, the toughness decreases, and the indentation peeling strength decreases Therefore, the C content is less than 0.40%. Preferably, it is less than 0.39%.

Si: 1.5% or less

Si is an element effective for solid solution strengthening of ferrite and increasing the strength. However, excessive addition of Si increases the hardness of the steel sheet in the vicinity of the interface between the nut and the steel sheet after projection welding, with the result that the toughness decreases and the indentation peeling strength decreases. Therefore, the Si content is 1.5% or less. It is preferably 1.0% or less, and more preferably 0.7% or less. Although the lower limit of the Si content is not particularly specified, it is preferable to set it at 0.005% because making the Si content extremely low leads to an increase in cost.

Mn: 1.1% or more and 2.4% or less

Mn is an element that increases the quench hardenability during hot pressing, and thus contributes to the formation of martensite after hot pressing, that is, the increase in strength. To obtain this effect, the Mn content needs to be 1.1% or more. Preferably, it is 1.3% or more. On the other hand, when Mn is excessively added, P segregates at the interface between the nut and the member after projection welding, and the indentation peeling strength is lowered. Therefore, the Mn content is 2.4% or less. Preferably, it is 2.2% or less, and more preferably less than 2.0%.

P: 0.05% or less

P contributes to the increase in strength by solid solution strengthening. However, when added excessively, segregation of P at grain boundaries becomes remarkable, the grain boundaries are embrittled, and the indentation peeling strength after projection welding is lowered. Therefore, the P content is 0.05% or less. Preferably, it is 0.04% or less, and more preferably 0.03% or less. Although the lower limit of the P content is not particularly specified, it is preferable to set it at 0.0005% because making the P content extremely low leads to an increase in steelmaking cost.

S: 0.005% or less

When the S content is high, a large amount of sulfides such as MnS is formed, and after projection welding such sulfides serve as a starting point of cracking, causing deterioration of the indentation peeling strength. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or more and 0.50% or less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.010% or less

Since N forms a coarse nitride, and after projection welding such a nitride serves as a starting point of cracking, causing deterioration of the indentation peeling strength, it is necessary to suppress the content. In particular, when the N content exceeds 0.010%, this tendency becomes remarkable. Therefore, the N content is 0.010% or less. Preferably, it is 0.008% or less.

Nb: 0.005% or more and 0.15% or less

Nb is an element that contributes to the increase in strength by forming fine carbonitrides. Furthermore, in the present disclosure, since fine Nb-based precipitates (Nb carbonitrides) suppress the coarsening of the prior austenite grain size, the indentation peeling strength after projection welding can be improved. To obtain this effect, the Nb content needs to be 0.005% or more. Preferably, it is 0.010% or more. On the other hand, adding a large amount of Nb fails to further increase the above effect, but instead increases the cost. Therefore, the Nb content is 0.15% or less. It is preferably 0.12% or less, and more preferably 0.10% or less.

Ti: 0.005% or more and 0.15% or less

Ti is an element that contributes to the increase in strength by forming a fine carbonitride. Furthermore, in the present disclosure, since fine Ti-based precipitates (Ti carbonitrides) suppress the coarsening of the prior austenite grain size, the indentation peeling strength after projection welding can be improved. To obtain this effect, the Ti content needs to be 0.005% or more. Preferably, it is 0.010% or more. On the other hand, even if a large amount of Ti is added, the above effect is saturated and the cost is increased. Therefore, the Ti content is 0.15% or less. Preferably, it is 0.12% or less, and more preferably 0.10% or less.

Moreover, in the present disclosure, the following components may be appropriately contained.

B: 0.0050% or less

B is an element that increases the quench hardenability during hot pressing, and thus contributes to the formation of martensite after hot pressing, that is, the increase in strength. Since B also improves the grain boundary strength by segregation at grain boundaries, it is effective for increasing the indentation peeling strength after projection welding. To obtain this effect, the B content is preferably 0.0002% or more. However, it is preferable that the B content be 0.0040% or less, because excessive addition of B deteriorates toughness and reduces the indentation peeling strength after projection welding. The B content is more preferably 0.0035% or less.

Mo: 0.50% or less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is preferably 0.50% or less. It is more preferably 0.35% or less.

Cr: 0.50% or less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is preferably 0.50% or less. It is more preferably 0.35% or less.

Sb: 0.001% or more and 0.020% or less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the indentation peeling strength after projection welding is improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or less, Mg: 0.005% or less, REM: 0.005% or less

Ca, Mg, and REM control the shapes of sulfides and oxides, and suppress the formation of coarse inclusions, thereby improving the delayed fracture resistance after projection welding. To obtain this effect, it is preferable to add each element in an amount of 0.0005% or more. However, excessive addition causes an increase in inclusions and a decrease in the toughness after projection welding, resulting in a lower indentation peeling strength. Therefore, the content of each added element is preferably 0.005% or less. Here, REM is an element containing Sc, Y, and lanthanoid elements.

V: 0.15% or less

V is an element that contributes to the increase in strength by forming a fine carbonitride. To obtain this effect, the V content is preferably 0.01% or more. On the other hand, since adding a large amount of V lowers the toughness at the time of resistance spot welding and reduces the indentation peeling strength after projection welding. Therefore, the V content is preferably 0.15% or less. It is more preferably 0.05% or less.

Cu: 0.50% or less

Cu can be added as needed because not only does it contribute to the increase in strength by solid solution strengthening, but it improves the corrosion resistance and thus can improve the delayed fracture resistance after projection welding. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or less

Similarly to Cu, Ni can also be added as needed because it can improve the delayed fracture resistance after projection welding by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness after projection welding and reduces the indentation peeling strength. Therefore, the Ni content is preferably 0.50% or less.

Sn: 0.50% or less

Similarly to Cu and Ni, Sn can also be added as needed because it can improve the delayed fracture resistance after projection welding by improving the corrosion resistance. To obtain these effects, the Sn content is 0.05% or more. However, the addition of a large amount of Sn lowers the toughness after projection welding and reduces the indentation peeling strength. Therefore, the Sn content is preferably 0.50% or less.

Zn: 0.10% or less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness after projection welding and reduces the indentation peeling strength. Therefore, the Zn content is preferably 0.10% or less.

Co: 0.10% or less

Similarly to Cu and Ni, Co can also be added as needed because it can improve the delayed fracture resistance after projection welding as it increases the corrosion resistance by improving the hydrogen overvoltage. To obtain these effects, the Co content is preferably 0.005% or more. However, the addition of a large amount of Co lowers the toughness after projection welding and reduces the indentation peeling strength. Therefore, the Co content is preferably 0.10% or less.

Zr: 0.10% or less

Similarly to Cu and Ni, Zr can also be added as needed because it can improve the delayed fracture resistance after projection welding by improving the corrosion resistance. To obtain these effects, the Zr content is preferably 0.005% or more. However, the addition of a large amount of Zr lowers the toughness after projection welding and reduces the indentation peeling strength. Therefore, the Zr content is preferably 0.10% or less.

Ta: 0.10% or less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is 0.10% or less.

W: 0.10% or less

Similarly to Cu and Ni, W can also be added as needed since it can improve the delayed fracture resistance after projection welding by improving the corrosion resistance. To obtain these effects, the W content is preferably 0.005% or more. However, since adding a large amount of W lowers the toughness after projection welding and reduces the indentation peeling strength. Therefore, the W content is preferably 0.10% or less.

The balance other than the above is Fe and inevitable impurities.

Next, the cold-rolled steel sheet for hot pressing and the coating or plating layer of the hot-pressed member according to the present disclosure will be described in detail.

[Coating or Plating Layer of Cold-Rolled Steel Sheet for Hot Pressing]

The cold-rolled steel sheet for hot pressing disclosed herein may be a cold-rolled steel sheet to which a coating or plating layer is not applied, yet in order to prevent oxidation by hot pressing or to improve corrosion resistance, a coating or plating layer may be applied onto the surface of the cold-rolled steel sheet before being subjected to hot pressing.

As a coating or plating layer to be applied onto the surface of the cold-rolled steel sheet for hot pressing according to the present disclosure, an Al or Al alloy coating or plating layer or a Zn or Zn alloy coating or plating layer is suitable. Applying such coating or plating layer onto the surface of the cold-rolled steel sheet for hot pressing prevents oxidation of the surface of the steel sheet by hot pressing, and the corrosion resistance of the hot-pressed member is further improved.

Examples of the Al or Al alloy coating or plating layer include an Al—Si coating layer formed by hot dip coating. In addition, examples of the Zn or Zn alloy coating or plating layer include a hot-dip galvanizing layer formed by hot dip coating, a galvannealing layer formed by alloying it, a Zn electroplating layer formed by electroplating, and a Zn—Ni alloy electroplating layer.

However, the Al or Al alloy coating or plating layer or the Zn or Zn alloy coating or plating layer is not limited to the above-described coating or plating layers, and may be a coating or plating layer which contains at least one of Si, Mg, Ni, Fe, Co, Mn, Sn, Pb, Be, B, P, S, Ti, V, W, Mo, Sb, Cd, Nb, Cr, and Sr in addition to the main component, Al or Zn. The method for forming the Al or Al alloy coating or plating layer or the Zn or Zn alloy coating or plating layer is not limited to the disclosed method at all, and any known hot dip coating, electroplating, vapor deposition plating, or the like is applicable. The Al or Al alloy coating or plating layer or the Zn or Zn alloy coating or plating layer may be a coating or plating layer subjected to an alloying treatment after the coating or plating step.

In the present disclosure, in particular, it is more preferable that the Zn or Zn alloy coating or plating layer is a Zn—Ni alloy coating or plating layer in order to further improve the corrosion resistance of the hot-pressed member or to prevent liquid metal embrittlement cracking caused by molten Zn during hot press forming.

The coating weight of the coating or plating layer is not particularly limited, and may be set in a general manner. For example, it is preferable to have a coating or plating layer with a coating weight of 5 g/m$^2$ to 150 g/m$^2$ per surface. If the coating weight is less than 5 g/m$^2$, it may be difficult to ensure corrosion resistance, while if it exceeds 150 g/m$^2$, the resistance to coating or plating exfoliation may deteriorate.

[Coating or Plating Layer of Hot-Pressed Member]

When a cold-rolled steel sheet for hot pressing to which an Al or Al alloy coating or plating layer or a Zn or Zn alloy coating or plating layer is applied is heated and then hot-pressed, some or all of the coating or plating layer components contained in the Al or Al alloy coating or plating layer or the Zn or Zn alloy coating or plating layer diffuse into the base steel sheet to form a solid solution phase or an intermetallic compound, and at the same time, conversely, Fe which is a component of the base steel sheet diffuses into the Al or Al alloy coating or plating layer or the Zn or Zn alloy coating or plating layer to form a solid solution phase or an intermetallic compound. Further, an oxide layer containing Al is formed on the surface of the Al or Al alloy coating of plating layer, and an oxide layer containing Zn is formed on the surface of the Zn or Zn alloy coating or plating layer.

As an example, when an Al—Si coating or plating layer is heated, it changes to a coating or plating layer mainly composed of an Fe—Al intermetallic compound containing Si. Further, when a hot-dip galvanizing layer, a galvannealing layer, a Zn electroplating layer, and the like are heated, an FeZn solid solution phase in which Zn is dissolved in Fe, a ZnFe intermetallic compound, a ZnO layer in the surface layer, and the like are formed. Furthermore, when the Zn—Ni alloy electroplating layer is heated, a solid solution layer containing Ni in which a coating or plating layer component is dissolved in Fe, an intermetallic compound mainly composed of ZnNi, a ZnO layer in the surface layer, and the like are formed.

As used herein, as described above, a coating or plating layer containing Al formed by heating a cold-rolled steel sheet for hot pressing to which an Al or Al alloy coating or plating layer is applied is referred to as an Al or Al alloy coating or plating layer, and a coating or plating layer containing Zn formed by heating a cold-rolled steel sheet for hot pressing to which a Zn or Zn alloy coating or plating layer is applied is referred to as a Zn or Zn alloy coating or plating layer.

Next, the method for manufacturing the cold-rolled steel sheet for hot pressing according to the present disclosure will be described.

In the present disclosure, in the production of the above-described cold-rolled steel sheet, at first, a steel material (slab) having the above-described predetermined composition is hot rolled to obtain a hot-rolled steel sheet under a condition of a finisher delivery temperature of 860° C. to 950° C., the hot rolling being started after heating of the steel material for 30 minutes or longer at a temperature of 1200° C. or higher.

After the hot rolling, the hot-rolled steel sheet is subjected to primary cooling whereby the hot-rolled steel sheet is cooled to a cooling end temperature of 700° C. or lower at a first average cooling rate of 70° C./s or higher up to the cooling end temperature.

After the primary cooling, the steel sheet is subjected to secondary cooling whereby the steel sheet is coiled at a coiling temperature of 500° C. or lower at a second average cooling rate of 5° C./s to 50° C./s up to the coiling temperature.

The coiled hot-rolled steel sheet is then pickled and cold-rolled to obtain a cold-rolled steel sheet, and then the cold-rolled steel sheet is subjected to a first annealing whereby the cold-rolled steel sheet is held for 600 seconds or shorter in a temperature range of 850° C. to 950° C. as a soaking temperature, then cooled to room temperature by water cooling, and subjected to 60 seconds to 1800 seconds of tempering in a temperature range of 150° C. to 300° C.

After the first annealing, the steel sheet is subjected to a second annealing whereby the steel sheet is heated to a temperature range of 720° C. to 850° C. at an average heating rate of 3° C./s to 30° C./s, held for 15 seconds or longer in a temperature range of 720° C. to 850° C. as a soaking temperature, and cooled to a cooling end temperature of 600° C. or lower at a third average cooling rate of 5° C./s or higher.

Hereinafter, the above manufacturing method will be described in detail for each step.

[Heating]

For a steel slab as a raw material after being cast, hot rolling is started after holding of the steel slab for 30 minutes or longer at a temperature of 1200° C. or higher without reheating, or after reheating of the steel slab to 1200° C. or higher and then holding for 30 minutes or longer. This treatment is important in order for Ti and Nb precipitated during casting to be solid-solved again.

In the present disclosure, after a steel slab is prepared, in addition to a conventional method in which a steel slab is first cooled to room temperature and then reheated, an energy saving process is also applicable without any problem, such as hot direct rolling or direct rolling, in which a steel slab is charged into a heating furnace as a warm slab without being cooled, in which a steel slab is rolled immediately after heat retention, or in which a steel slab is rolled directly after casting.

[Hot Rolling]

Finisher Delivery Temperature: 860° C. to 950° C.

The hot rolling needs to be finished in the austenite single phase region in order to improve the resistance to resistance welding cracking after annealing by increasing the uniformity of the microstructure of the steel sheet and reducing the anisotropy of the material property. Therefore, the finisher delivery temperature is 860° C. or higher. On the other hand, when the finisher delivery temperature exceeds 950° C., the crystal grains in the microstructure after hot rolling become coarse, and the crystal grains after annealing are also coarsened. Therefore, the upper limit of the finisher delivery temperature is 950° C.

[Cooling After the Hot Rolling]

Primary cooling: Cooling to 700° C. or lower at a first average cooling rate of 70° C./s or higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Nb-based precipitates. Accordingly, at first, as primary cooling, cooling is performed to 700° C. or lower at a first average cooling rate of 70° C./s or higher. If the first average cooling rate is lower than 70° C./s, the ferrite is coarsened, and the microstructure of the hot-rolled steel sheet becomes inhomogeneous, leading to a reduction in the indentation peeling strength after projection welding. On the other hand, if the cooling end temperature in the primary cooling is higher than 700° C., pearlite is excessively formed in the microstructure of the hot-rolled steel sheet, and the microstructure of the steel sheet eventually becomes heterogeneous, again leading to a reduction in the indentation peeling strength after projection welding.

Secondary cooling: Cooling to 500° C. or lower at a second average cooling rate of 5° C./s to 50° C./s If the average cooling rate in this secondary cooling is lower than 5° C./s, ferrite or pearlite is excessively formed in the microstructure of the hot-rolled steel sheet, and the microstructure of the steel sheet eventually becomes heterogeneous, and Nb and Ti carbonitrides coarsen, leading to a reduction in the indentation peeling strength after projection welding. On the other hand, if the average cooling rate in the secondary cooling is higher than 50° C./s, pearlite is excessively formed in the microstructure of the hot-rolled steel sheet, and the element distribution of C becomes uneven, leading to a reduction in the indentation peeling strength after projection welding following the hot pressing. Furthermore, cooling to temperatures above 500° C. causes excessive formation of ferrite or pearlite in the microstructure of the hot-rolled steel sheet and coarsening of the Nb and Ti carbonitrides, again leading to a reduction in the indentation peeling strength after projection welding.

Coiling temperature: 500° C. or lower

If the coiling temperature is higher than 500° C., ferrite and pearlite are excessively formed in the microstructure of the hot-rolled steel sheet, and the microstructure of the steel sheet eventually becomes heterogeneous, leading to a reduction in the indentation peeling strength after projection welding. To avoid this, it is important to perform coiling in a temperature range with a bainite transformation. In addition, when coiling is performed at high temperature, Nb and Ti carbonitrides coarsen, and the indentation peeling strength after projection welding deteriorates. Therefore, in the present disclosure, the upper limit of the coiling temperature is 500° C. It is preferably 470° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Cold Rolling]

Cold rolling is performed to roll a steel sheet into a cold-rolled sheet having a predetermined thickness. The cold rolling is not particularly limited and may be carried out according to a conventional method.

[First Annealing]

This annealing is carried out to promote recrystallization after cold rolling and to control the microstructure of the steel sheet after being subjected to hot pressing and the intergrain state of Nb and Ti carbonitrides. Nb and Ti in a solid-solved state after hot rolling are finely precipitated through annealing and quenching in an austenite single phase region. Moreover, in a martensite single phase, more nucleation sites are formed in the second annealing step, and crystal grains in the microstructure of the steel sheet are refined.

Soaking temperature: 850° C. to 950° C.

The soaking temperature is set to a temperature range in the austenite range. If the temperature is lower than 850° C., crystal grains in the microstructure of the steel sheet formed in the second annealing step are coarsened, and the desired austenite grain size after hot pressing can not be obtained. Therefore, the lower limit of the soaking temperature is 850° C. However, when the soaking temperature is too high, Nb and Ti carbonitrides become coarse, and the desired precipitation state can not be obtained after hot pressing. Therefore, the soaking temperature is 950° C. or lower. Preferably, it is 900° C. or lower.

Soaking duration: 600 seconds or shorter

If the duration exceeds 600 seconds at the above soaking temperature, Nb and Ti carbonitrides coarsen, and the desired precipitation state can not be obtained after hot pressing. Therefore, the soaking duration is 600 seconds or shorter. Preferably, it is 300 seconds or shorter. However, when the soaking duration is too short, Nb and Ti remain in a solid-solved state. Therefore, the soaking duration is preferably 5 seconds or longer.

Tempering temperature: 150° C. to 300° C.

In order to increase nucleation sites in the subsequent second annealing step, tempering is performed at 150° C. to 300° C. If the tempering temperature is lower than 150° C., nucleation sites are insufficient, and the desired austenite grain size can not be obtained after hot pressing. However, if the temperature exceeds 300° C., Nb and Ti carbonitrides are coarsened, and the desired precipitation state can not be obtained after hot pressing.

Tempering time: 60 seconds to 1800 seconds

In order to increase nucleation sites in the subsequent second annealing step, tempering is performed for 60 seconds to 1800 seconds. If the tempering time is shorter than 60 seconds, nucleation sites are insufficient, and the desired austenite grain size can not be obtained after hot pressing. On the other hand, if the tempering time exceeds 1800 seconds, Nb and Ti carbonitrides coarsen, and the desired precipitation state can not be obtained after hot pressing.

[Second Annealing]

In the second annealing, excessively rapid heating makes it difficult for recrystallization to proceed. Therefore, the upper limit of the average heating rate is set at 30° C./s. However, when the heating rate is too low, ferrite and martensite grains become coarsened, and a desired microstructure can not be obtained after hot pressing. Therefore, an average heating rate of 3° C./s or higher is required. It is preferably 8° C./s or higher. By controlling the average heating rate, it is possible to make the crystal grains finer.

Then, the steel sheet is heated to a soaking temperature range of 720° C. to 850° C. described later.

Soaking temperature: 720° C. to 850° C.

The soaking temperature is set in a temperature range of a ferrite and austenite dual phase region. Below 720° C., coarse cementite precipitates form. Therefore, the lower limit of the soaking temperature is set at 720° C. On the other hand, if the soaking temperature is too high, crystal grain growth of austenite becomes remarkable, the crystal grains and Ti and Nb carbonitrides become coarse, and the indentation peeling strength after projection welding decreases. Therefore, the soaking temperature is 850° C. or lower. It is preferably 830° C. or lower.

Soaking duration: 15 seconds or longer

In the above-described soaking temperature range, a holding time of at least 15 seconds is necessary for progress of recrystallization and austenite transformation of some or all of the microstructures. On the other hand, if the holding time is excessively long, microsegregation of Mn is promoted and bending workability is deteriorated. Therefore, the holding time is preferably 600 seconds or shorter.

[Cooling]

Cooling conditions after soaking: Cooling to a temperature range of 600° C. or lower at a third average cooling rate of 5° C./s or higher After the above-described soaking treatment (annealing treatment), it is necessary to perform cooling at an average cooling rate of 5° C./s or higher from the soaking temperature to a temperature range (cooling end temperature) of 600° C. or lower. If the average cooling rate is lower than 5° C./s, ferrite transformation proceeds during cooling, and the volume fraction of martensite in the cold-rolled steel sheet decreases and Nb and Ti carbonitrides become coarse, resulting in a lower indentation peeling strength after projection welding. The upper limit of the average cooling rate is not particularly specified, yet is preferably 30° C./s or lower from the viewpoint of equipment and cost. In addition, when the cooling end temperature is higher than 600° C., pearlite is excessively formed, and a predetermined volume fraction in the microstructure of the steel sheet can not be obtained, causing deterioration of the indentation peeling strength after projection welding.

In the above-described series of manufacturing processes, particularly important in the present disclosure are the hot rolling step (including the subsequent two-stage cooling step) and two-stage annealing steps (including the subsequent cooling step).

That is, by appropriately controlling the above-mentioned hot rolling step and second annealing step, pearlite can be contained in an amount of 30% or less by volume ratio. In addition, by appropriately controlling the hot rolling step and first and second annealing steps, it is ensured that at least 10 Nb and Ti carbonitrides having a grain size of less than 0.10 μm in the range of 150 μm in the thickness direction from the surface of the steel sheet are present on average per 100 μm$^2$ of a cross section parallel to the thickness direction of the steel sheet, and that the average intergrain distance of such Nb and Ti carbonitrides is 5 μm or less.

Thereafter, the cold-rolled steel sheet may be subjected to a coating or plating treatment such as hot-dip galvanizing, or used as it is without being subjected to such treatment.

[Coating or Plating]

The cold-rolled steel sheet for hot pressing disclosed herein may be used as the cold-rolled steel sheet manufactured by the above-described manufacturing process or, depending on the purpose, may be subjected to an Al or Al alloy coating or plating treatment or a Zn or Zn alloy coating or plating treatment to form an Al or Al alloy coating or plating layer or a Zn or Zn alloy coating or plating layer.

Such coating or plating treatment is not limited at all, and any known hot-dip coating, electroplating, vapor deposition plating, and the like can be applied. In addition, after the coating or plating step, an alloying treatment may be performed. For typical coating or plating treatments, examples of the Al or Al alloy coating or plating treatment include a treatment to apply hot-dip aluminum (Al) coating and a treatment to apply hot-dip Al—Si coating, and examples of zinc or zinc alloy coating or plating treatment include a treatment to apply hot-dip galvanizing or zinc-nickel electroplating and a treatment to apply hot-dip galvanizing followed by an alloying treatment.

Temper rolling may also be carried out on the cold-rolled steel sheet. In this case, a preferred elongation ratio is 0.05% to 2.0%.

The cold-rolled steel sheet thus obtained is hot-pressed to form a hot-pressed member. At this time, the method of hot pressing is not particularly limited and may be performed according to a conventional method.

Although one example is given below, the present disclosure is not so limited. For example, a cold-rolled steel sheet for hot pressing as a raw material may be heated to a temperature range of an $Ac_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the $Ac_3$ transformation temperature can be determined by:

$$Ac_3 \text{ transformation temperature (° C.)} = 881 - 206C + 53Si - 15Mn - 20Ni - 1Cr - 27Cu + 41Mo$$

Where each element symbol represents the content by mass % of the corresponding element. For any element not contained, it is calculated as zero.

EXAMPLES

The following describes examples according to the disclosure.

The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and continuously cast into slabs, then heated to the temperature ranges listed in Table 2, and then subjected to hot rolling under the conditions listed in Table 2 for the finisher delivery temperature (FDT). Then, each hot-rolled steel sheet is cooled to a cooling end temperature (first cooling temperature) at a first average cooling rate (Cooling Rate 1) listed in Table 2, then cooled to a coiling temperature (CT) at a second average cooling rate (Cooling Rate 2), and then wound in a coil form.

Then, each hot-rolled sheet thus obtained was pickled, and then cold rolled with a rolling reduction listed in Table 2 to obtain a cold-rolled sheet (sheet thickness: 1.4 mm).

Then, each cold-rolled steel sheet thus obtained was subjected to a first annealing treatment under the conditions listed in Table 2 in a continuous annealing line (CAL) to obtain a cold-rolled steel sheet.

Subsequently, each cold-rolled steel sheet was subjected to a second annealing treatment under the conditions listed in Table 2 in a continuous annealing line (CAL) or a continuous galvanizing line (CGL), and cold-rolled steel sheets (CR) were obtained for those having passed through CAL and hot-dip galvanized steel sheets (GI) were obtained for those having passed through CGL.

Note that some of the steel sheets having passed through CGL were subjected to a hot-dip galvanization treatment, followed by an alloying treatment at 550° C., to obtain galvannealed steel sheets (GA). In addition, a hot-dip aluminum coating treatment was performed to obtain a hot-dip aluminum coated steel sheet (AS). Furthermore, some were partially annealed in CAL, and zinc-nickel electroplated steel sheets (EZN) were obtained in an electrogalvanizing line (EGL). Note that some samples were not subjected to a two-stage annealing treatment, but to a single annealing treatment after being subjected to cold rolling.

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

As for indentation peeling strength after projection welding, test specimens of 50 mm×150 mm were collected from various hot-pressed members. In each specimen, a hole of 10 mm in diameter was made at the center, and an M6-welding nut having four projection parts was set on an alternating current welding machine such that the center of the hole of the specimen would coincide with the center of the hole of the nut. The welding was performed by resistance welding using a single phase alternating current (50 Hz) resistance welding machine of servomotor pressure type attached to a welding gun, and test specimens having projection welds were produced. Note that the pair of electrode tips used was a flat 30 mmφ electrode pair. The welding conditions were a pressing force of 3000 N, an energization time of 7 cycles (50 Hz), a welding current of 12 kA, and a hold time of 10 cycles (50 Hz).

After fixing a bolt in the nut hole of the welded body thus obtained, the load when the nut was peeled off from the steel sheet was measured by the indentation-peel test according to JIS B 1196: 2001. The indentation peeling strength of the projection weld was judged as "Good" if the load at that time was 8 kN or more, "Fair" if the load was 6.5 kN or more and less than 8 kN, or "Poor" if the load was less than 6.5 kN.

To determine the volume fraction of martensite and pearlite of the cold-rolled steel sheet after being annealed and the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction. Using Image-Pro available from Media Cybernetics, micrographs in which crystal grains of prior austenite and ferrite had been respectively identified in advance were captured from the microstructural micrographs of each steel sheet (taken at 10 locations of 20 μm×20 μm at 5000 times magnification) to determine the area of each crystal grain. The equivalent circular diameter of each crystal grain was calculated, the results were averaged, and the average was used as the area of each crystal grain.

Further, for both cold-rolled steel sheets and pressed members, to determine the grain size of Nb and Ti carbonitrides, a cross section parallel to the thickness direction was observed at 10 locations of 0.5 μm×0.5 μm under a transmission electron microscope (TEM) at 10000 times magnification, and the equivalent circle diameter was calculated using Image-Pro available from Media Cybernetics with a lower limit of 0.005 μm to determine the grain size. To determine the number of Nb and Ti carbonitrides having a grain size of less than 0.10 μm, the cross section was observed at 10 locations of 0.5 μm×0.5 μm under a transmission electron microscope (TEM) at 10000 times magnification, and the average number density of these 10 locations was obtained. In this method, it was possible to count Nb and Ti carbonitrides having a grain size of 0.005 μm or more.

Further, the intergrain distance (λ) of Nb and Ti carbonitrides was measured as follows. Specifically, an L-cross section was observed at 10000 times magnification using a transmission electron microscope (TEM), and the intergrain distance (λ) was determined according to the conventionally reported equation (1):

$$\lambda = (0.9\, V_p^{-1/2} - 0.8) \times d_p \quad (1),$$

where $V_p$ denotes a volume fraction (%) of grains, and $d_p$ denotes a grain size. As for the volume fraction of grains, the area fraction obtained from the observation results of TEM was used.

The microstructures of the cold-rolled steel sheets and the hot-pressed members thus obtained are listed in Table 4. In addition, Table 5 lists the measurement results of the tensile properties and the indentation peeling strength after projection welding of the hot-pressed members.

TABLE 1

| Steel ID | Chemical composition (mass %) | | | | | | | | | | Ac₃ transformation temp. (° C.) |
|---|---|---|---|---|---|---|---|---|---|---|---|
| | C | Si | Mn | P | S | Al | N | Nb | Ti | Others | |
| A | 0.32 | 0.22 | 1.77 | 0.01 | 0.001 | 0.03 | 0.002 | 0.019 | 0.022 | — | 800 |
| B | 0.32 | 0.25 | 1.35 | 0.01 | 0.001 | 0.03 | 0.002 | 0.021 | 0.025 | Cr: 0.15, B: 0.0021, Sb: 0.005 | 808 |
| C | 0.37 | 0.85 | 1.69 | 0.01 | 0.003 | 0.02 | 0.003 | 0.029 | 0.032 | Mo: 0.15, Cu: 0.12, Ni: 0.13 | 825 |
| D | 0.34 | 0.62 | 1.56 | 0.02 | 0.002 | 0.03 | 0.002 | 0.033 | 0.021 | V: 0.01, Sn: 0.10, Zr: 0.01 | 820 |
| E | 0.29 | 0.33 | 1.99 | 0.02 | 0.002 | 0.03 | 0.002 | 0.021 | 0.018 | Zn: 0.01, Ta: 0.03, W: 0.03 | 809 |
| F | 0.33 | 0.09 | 1.54 | 0.01 | 0.003 | 0.02 | 0.003 | 0.021 | 0.059 | Co: 0.02, B: 0.002, Ni: 0.15 | 792 |
| G | 0.34 | 0.22 | 2.01 | 0.02 | 0.002 | 0.03 | 0.003 | 0.022 | 0.015 | Ca; 0.001, Mg: 0.001, REM: 0.001 | 792 |
| H | 0.24 | 0.25 | 1.54 | 0.01 | 0.001 | 0.03 | 0.003 | 0.025 | 0.018 | — | 822 |
| I | 0.48 | 0.02 | 2.20 | 0.01 | 0.001 | 0.03 | 0.002 | 0.021 | 0.035 | — | 750 |
| J | 0.31 | 0.43 | 0.50 | 0.01 | 0.001 | 0.03 | 0.002 | 0.014 | 0.041 | — | 832 |
| K | 0.33 | 0.19 | 3.84 | 0.01 | 0.001 | 0.02 | 0.002 | 0.033 | 0.015 | — | 765 |
| L | 0.36 | 0.21 | 2.16 | 0.03 | 0.001 | 0.02 | 0.003 | — | — | — | 786 |

TABLE 2

| Specimen No. | Steel ID | Hot rolling Heating temp. hr | Heating time min | FDT °C. | Cooling rate 1 °C./s | First cooling temp. °C. | Cooling rate 2 °C./s | CT °C. | Cold rolling Rolling reduction % | First annealing Soaking temp. °C. | Holding time s | Tempering temp. °C. | Tempering time s | Average heating rate °C./s | Second annealing Soaking temp. °C. | Holding time s | Cooling rate 3 °C./s | Cooling end temp. °C. | Coating or plating | Remarks |
|---|---|---|---|---|---|---|---|---|---|---|---|---|---|---|---|---|---|---|---|---|
| 1 | A | 1250 | 60 | 900 | 100 | 640 | 20 | 470 | 50 | 860 | 200 | 200 | 200 | 10 | 760 | 180 | 10 | 525 | GA | Example |
| 2 | B | 1250 | 60 | 900 | 100 | 640 | 20 | 470 | 50 | 860 | 200 | 200 | 200 | 10 | 760 | 180 | 10 | 525 | GA | Example |
| 3 | C | 1250 | 60 | 900 | 100 | 640 | 20 | 470 | 50 | 860 | 200 | 200 | 200 | 10 | 760 | 180 | 10 | 525 | GA | Example |
| 4 | D | 1250 | 60 | 900 | 100 | 640 | 20 | 470 | 50 | 860 | 200 | 200 | 200 | 10 | 760 | 180 | 10 | 525 | GA | Example |
| 5 | E | 1250 | 60 | 900 | 100 | 640 | 20 | 470 | 50 | 860 | 200 | 200 | 200 | 10 | 760 | 180 | 10 | 525 | GA | Example |
| 6 | F | 1250 | 60 | 900 | 100 | 640 | 20 | 470 | 50 | 860 | 200 | 200 | 200 | 10 | 760 | 180 | 10 | 525 | GA | Example |
| 7 | G | 1250 | 60 | 900 | 100 | 640 | 20 | 470 | 50 | 860 | 200 | 200 | 200 | 10 | 760 | 180 | 10 | 525 | GA | Example |
| 8 | A | 1250 | 60 | 900 | 100 | 640 | 20 | 470 | 50 | 860 | 200 | 200 | 200 | 10 | 760 | 180 | 10 | 525 | CR | Example |
| 9 | B | 1250 | 60 | 900 | 100 | 640 | 20 | 470 | 50 | 860 | 200 | 200 | 200 | 10 | 760 | 180 | 10 | 525 | CR | Example |
| 10 | C | 1250 | 60 | 900 | 100 | 640 | 20 | 470 | 50 | 860 | 200 | 200 | 200 | 10 | 760 | 180 | 10 | 525 | CR | Example |
| 11 | D | 1250 | 60 | 900 | 100 | 640 | 20 | 470 | 50 | 860 | 200 | 200 | 200 | 10 | 760 | 180 | 10 | 525 | CR | Example |
| 12 | E | 1250 | 60 | 900 | 100 | 640 | 20 | 470 | 50 | 860 | 200 | 200 | 200 | 10 | 760 | 180 | 10 | 525 | CR | Example |
| 13 | F | 1250 | 60 | 900 | 100 | 640 | 20 | 470 | 50 | 860 | 200 | 200 | 200 | 10 | 760 | 180 | 10 | 525 | CR | Example |
| 14 | G | 1250 | 60 | 900 | 100 | 640 | 20 | 470 | 50 | 860 | 200 | 200 | 200 | 10 | 760 | 180 | 10 | 525 | CR | Example |
| 15 | A | 1250 | 60 | 900 | 100 | 640 | 20 | 470 | 50 | 860 | 200 | 200 | 200 | 10 | 760 | 180 | 10 | 525 | AS | Example |
| 16 | B | 1250 | 60 | 900 | 100 | 640 | 20 | 470 | 50 | 860 | 200 | 200 | 200 | 10 | 760 | 180 | 10 | 525 | AS | Example |
| 17 | C | 1250 | 60 | 900 | 100 | 640 | 20 | 470 | 50 | 860 | 200 | 200 | 200 | 10 | 760 | 180 | 10 | 525 | AS | Example |
| 18 | D | 1250 | 60 | 900 | 100 | 640 | 20 | 470 | 50 | 860 | 200 | 200 | 200 | 10 | 760 | 180 | 10 | 525 | AS | Example |
| 19 | E | 1250 | 60 | 900 | 100 | 640 | 20 | 470 | 50 | 860 | 200 | 200 | 200 | 10 | 760 | 180 | 10 | 525 | AS | Example |
| 20 | F | 1250 | 60 | 900 | 100 | 640 | 20 | 470 | 50 | 860 | 200 | 200 | 200 | 10 | 760 | 180 | 10 | 525 | AS | Example |
| 21 | G | 1250 | 60 | 900 | 100 | 640 | 20 | 470 | 50 | 860 | 200 | 200 | 200 | 10 | 760 | 180 | 10 | 525 | AS | Example |
| 22 | A | 1250 | 60 | 900 | 100 | 640 | 20 | 470 | 50 | 860 | 200 | 200 | 200 | 10 | 760 | 180 | 10 | 525 | GI | Example |
| 23 | B | 1250 | 60 | 900 | 100 | 640 | 20 | 470 | 50 | 860 | 200 | 200 | 200 | 10 | 760 | 180 | 10 | 525 | GI | Example |
| 24 | C | 1250 | 60 | 900 | 100 | 640 | 20 | 470 | 50 | 860 | 200 | 200 | 200 | 10 | 760 | 180 | 10 | 525 | GI | Example |
| 25 | D | 1250 | 60 | 900 | 100 | 640 | 20 | 470 | 50 | 860 | 200 | 200 | 200 | 10 | 760 | 180 | 10 | 525 | GI | Example |
| 26 | E | 1250 | 60 | 900 | 100 | 640 | 20 | 470 | 50 | 860 | 200 | 200 | 200 | 10 | 760 | 180 | 10 | 525 | GI | Example |
| 27 | F | 1250 | 60 | 900 | 100 | 640 | 20 | 470 | 50 | 860 | 200 | 200 | 200 | 10 | 760 | 180 | 10 | 525 | GI | Example |
| 28 | G | 1250 | 60 | 900 | 100 | 640 | 20 | 470 | 50 | 860 | 200 | 200 | 200 | 10 | 760 | 180 | 10 | 525 | GI | Example |
| 29 | A | 1250 | 60 | 900 | 100 | 640 | 20 | 470 | 50 | 860 | 200 | 200 | 200 | 10 | 760 | 180 | 10 | 525 | EZN | Example |
| 30 | B | 1250 | 60 | 900 | 100 | 640 | 20 | 470 | 50 | 860 | 200 | 200 | 200 | 10 | 760 | 180 | 10 | 525 | EZN | Example |
| 31 | C | 1250 | 60 | 900 | 100 | 640 | 20 | 470 | 50 | 860 | 200 | 200 | 200 | 10 | 760 | 180 | 10 | 525 | EZN | Example |
| 32 | D | 1250 | 60 | 900 | 100 | 640 | 20 | 470 | 50 | 860 | 200 | 200 | 200 | 10 | 760 | 180 | 10 | 525 | EZN | Example |
| 33 | E | 1250 | 60 | 900 | 100 | 640 | 20 | 470 | 50 | 860 | 200 | 200 | 200 | 10 | 760 | 180 | 10 | 525 | EZN | Example |
| 34 | F | 1250 | 60 | 900 | 100 | 640 | 20 | 470 | 50 | 860 | 200 | 200 | 200 | 10 | 760 | 180 | 10 | 525 | EZN | Example |
| 35 | G | 1250 | 60 | 900 | 100 | 640 | 20 | 470 | 50 | 860 | 200 | 200 | 200 | 10 | 760 | 180 | 10 | 525 | EZN | Example |
| 36 | A | 1250 | 60 | 900 | 100 | 640 | 20 | 470 | 50 | 860 | 200 | 200 | 200 | 10 | 760 | 180 | 10 | 525 | GA | Example |
| 37 | A | 1250 | 60 | 900 | 100 | 640 | 20 | 470 | 50 | 860 | 200 | 200 | 200 | 10 | 760 | 180 | 10 | 525 | GA | Example |
| 38 | A | 1250 | 60 | 900 | 100 | 640 | 20 | 470 | 50 | 860 | 200 | 200 | 200 | 10 | 760 | 180 | 10 | 525 | GA | Example |
| 39 | A | 1250 | 60 | 900 | 100 | 640 | 20 | 470 | 50 | 860 | 200 | 200 | 200 | 10 | 760 | 180 | 10 | 525 | GA | Example |
| 40 | A | 1250 | 60 | 900 | 100 | 640 | 20 | 470 | 50 | 860 | 200 | 200 | 200 | 10 | 760 | 180 | 10 | 525 | GA | Example |
| 41 | A | 1250 | 60 | 900 | 100 | 640 | 20 | 470 | 50 | 860 | 200 | 200 | 200 | 10 | 760 | 180 | 10 | 525 | GA | Example |
| 42 | A | 1250 | 60 | 900 | 100 | 640 | 20 | 470 | 50 | 860 | 200 | 200 | 200 | 10 | 760 | 180 | 10 | 525 | GA | Example |
| 43 | A | 1250 | 60 | 900 | 100 | 640 | 20 | 470 | 50 | 860 | 200 | 200 | 200 | 10 | 760 | 180 | 10 | 525 | GA | Example |

TABLE 2-continued

| Specimen No. | Steel ID | Hot rolling ||||||| Cold rolling | First annealing |||| Second annealing ||||| Coating or plating | Remarks |
| | | Heating temp. hr | Heating time min | FDT °C. | Cooling rate 1 °C./s | First cooling temp. °C. | Cooling rate 2 °C./s | CT °C. | Rolling reduction % | Soaking temp. °C. | Holding time s | Tempering temp. °C. | Tempering time s | Average heating rate °C./s | Soaking temp. °C. | Holding time s | Cooling rate 3 °C./s | Cooling end temp. °C. | | |
|---|---|---|---|---|---|---|---|---|---|---|---|---|---|---|---|---|---|---|---|---|
| 44 | A | 1250 | 60 | 900 | 100 | 640 | 20 | 470 | 50 | 860 | 200 | 200 | 200 | 10 | 760 | 180 | 10 | 525 | GA | Example |
| 45 | A | 1250 | 60 | 900 | 100 | 640 | 20 | 470 | 50 | 860 | 200 | 200 | 200 | 10 | 760 | 180 | 10 | 525 | GA | Example |
| 46 | A | 1250 | 60 | 900 | 100 | 640 | 20 | 470 | 50 | 860 | 200 | 200 | 200 | 10 | 760 | 180 | 10 | 525 | GA | Example |
| 47 | A | 1100 | 60 | 900 | 100 | 640 | 20 | 470 | 50 | 860 | 200 | 200 | 200 | 10 | 760 | 180 | 10 | 525 | GA | Comparative example |
| 48 | A | 1250 | 10 | 900 | 100 | 640 | 20 | 470 | 50 | 860 | 200 | 200 | 200 | 10 | 760 | 180 | 10 | 525 | CR | Comparative example |
| 49 | A | 1250 | 60 | 900 | 30 | 650 | 20 | 470 | 50 | 860 | 200 | 200 | 200 | 10 | 760 | 180 | 10 | 525 | CR | Comparative example |
| 50 | A | 1250 | 60 | 900 | 100 | 770 | 20 | 470 | 50 | 860 | 200 | 200 | 200 | 10 | 760 | 180 | 10 | 525 | GA | Comparative example |
| 51 | A | 1250 | 60 | 900 | 100 | 620 | 2 | 470 | 50 | 860 | 200 | 200 | 200 | 10 | 760 | 180 | 10 | 525 | GA | Comparative example |
| 52 | A | 1250 | 60 | 900 | 100 | 680 | 10 | 650 | 50 | 860 | 200 | 200 | 200 | 10 | 760 | 180 | 10 | 525 | GA | Comparative example |
| 53 | A | 1250 | 60 | 900 | 100 | 680 | 10 | 470 | 50 | 740 | 200 | 200 | 200 | 10 | 760 | 180 | 10 | 525 | CR | Comparative example |
| 54 | A | 1250 | 60 | 900 | 100 | 680 | 10 | 470 | 50 | 1000 | 200 | 200 | 200 | 10 | 760 | 180 | 10 | 525 | CR | Comparative example |
| 55 | A | 1250 | 60 | 900 | 100 | 680 | 10 | 470 | 50 | 860 | 1800 | 200 | 200 | 10 | 760 | 180 | 10 | 525 | GA | Comparative example |
| 56 | A | 1250 | 60 | 900 | 100 | 680 | 10 | 470 | 50 | 860 | 200 | 500 | 200 | 10 | 760 | 180 | 10 | 525 | GA | Comparative example |
| 57 | A | 1250 | 60 | 900 | 100 | 620 | 25 | 470 | 50 | 860 | 200 | 200 | 200 | 1 | 760 | 180 | 10 | 525 | GA | Comparative example |
| 58 | B | 1250 | 60 | 900 | 100 | 600 | 25 | 470 | 50 | 860 | 200 | 200 | 200 | 10 | 600 | 180 | 10 | 525 | GA | Comparative example |
| 59 | B | 1250 | 60 | 900 | 100 | 600 | 25 | 470 | 50 | 860 | 200 | 200 | 200 | 10 | 950 | 180 | 10 | 525 | CR | Comparative example |
| 60 | B | 1250 | 60 | 900 | 100 | 600 | 25 | 470 | 50 | 860 | 200 | 200 | 200 | 10 | 800 | 2 | 10 | 525 | CR | Comparative example |
| 61 | B | 1250 | 60 | 900 | 100 | 600 | 25 | 470 | 50 | 860 | 200 | 200 | 200 | 10 | 780 | 180 | 1 | 525 | GA | Comparative example |
| 62 | B | 1250 | 60 | 900 | 100 | 600 | 25 | 470 | 50 | 860 | 200 | 200 | 200 | 10 | 780 | 180 | 10 | 700 | GA | Comparative example |
| 63 | H | 1250 | 60 | 900 | 100 | 600 | 25 | 470 | 50 | 860 | 200 | 200 | 200 | 10 | 780 | 180 | 10 | 525 | GA | Comparative example |
| 64 | I | 1250 | 60 | 900 | 100 | 600 | 25 | 470 | 50 | 860 | 200 | 200 | 200 | 10 | 780 | 180 | 10 | 525 | GA | Comparative example |
| 65 | J | 1250 | 60 | 900 | 100 | 600 | 25 | 470 | 50 | 860 | 200 | 200 | 200 | 10 | 780 | 180 | 1 | 525 | GA | Comparative example |
| 66 | K | 1250 | 60 | 900 | 100 | 600 | 25 | 470 | 50 | 860 | 200 | 200 | 200 | 10 | 770 | 180 | 30 | 525 | GA | Example |
| 67 | K | 1250 | 60 | 900 | 100 | 600 | 25 | 470 | 50 | 860 | 200 | 200 | 200 | 10 | 780 | 180 | 10 | 525 | GA | Comparative example |
| 68 | L | 1250 | 60 | 900 | 100 | 600 | 25 | 470 | 50 | 860 | 200 | 200 | 200 | 10 | 820 | 180 | 5 | 525 | GA | Example |
| 69 | L | 1250 | 60 | 900 | 100 | 600 | 25 | 470 | 50 | 860 | 200 | 200 | 200 | 10 | 780 | 180 | 10 | 525 | GA | Comparative example |
| 70 | A | 1250 | 60 | 900 | 100 | 600 | 25 | 470 | 50 | 860 | 200 | 200 | 200 | — | — | — | — | — | GA | Comparative example |
| 71 | B | 1250 | 60 | 900 | 100 | 600 | 25 | 470 | 50 | 860 | 200 | 200 | 200 | — | — | — | — | — | CR | Comparative example |

TABLE 3

| | | Hot pressing | | | | | |
|---|---|---|---|---|---|---|---|
| Specimen No. | Steel ID | Heating rate °C./s | Heating temp. °C. | Holding time s | Hot pressing temp. °C. | Cooling rate up to 150° C. °C./s | Remarks |
| 1 | A | 5 | 900 | 60 | 700 | 100 | Example |
| 2 | B | 5 | 900 | 60 | 700 | 100 | Example |
| 3 | C | 5 | 900 | 60 | 700 | 100 | Example |
| 4 | D | 5 | 900 | 60 | 700 | 100 | Example |
| 5 | E | 5 | 900 | 60 | 700 | 100 | Example |
| 6 | F | 5 | 900 | 60 | 700 | 100 | Example |
| 7 | G | 5 | 900 | 60 | 700 | 100 | Example |
| 8 | A | 5 | 900 | 60 | 700 | 100 | Example |
| 9 | B | 5 | 900 | 60 | 700 | 100 | Example |
| 10 | C | 5 | 900 | 60 | 700 | 100 | Example |
| 11 | D | 5 | 900 | 60 | 700 | 100 | Example |
| 12 | E | 5 | 900 | 60 | 700 | 100 | Example |
| 13 | F | 5 | 900 | 60 | 700 | 100 | Example |
| 14 | G | 5 | 900 | 60 | 700 | 100 | Example |
| 15 | A | 5 | 900 | 60 | 700 | 100 | Example |
| 16 | B | 5 | 900 | 60 | 700 | 100 | Example |
| 17 | C | 5 | 900 | 60 | 700 | 100 | Example |
| 18 | D | 5 | 900 | 60 | 700 | 100 | Example |
| 19 | E | 5 | 900 | 60 | 700 | 100 | Example |
| 20 | F | 5 | 900 | 60 | 700 | 100 | Example |
| 21 | G | 5 | 900 | 60 | 700 | 100 | Example |
| 22 | A | 5 | 900 | 60 | 700 | 100 | Example |
| 23 | B | 5 | 900 | 60 | 700 | 100 | Example |
| 24 | C | 5 | 900 | 60 | 700 | 100 | Example |
| 25 | D | 5 | 900 | 60 | 700 | 100 | Example |
| 26 | E | 5 | 900 | 60 | 700 | 100 | Example |
| 27 | F | 5 | 900 | 60 | 700 | 100 | Example |
| 28 | G | 5 | 900 | 60 | 700 | 100 | Example |
| 29 | A | 5 | 900 | 60 | 700 | 100 | Example |
| 30 | B | 5 | 900 | 60 | 700 | 100 | Example |
| 31 | C | 5 | 900 | 60 | 700 | 100 | Example |
| 32 | D | 5 | 900 | 60 | 700 | 100 | Example |
| 33 | E | 5 | 900 | 60 | 700 | 100 | Example |
| 34 | F | 5 | 900 | 60 | 700 | 100 | Example |
| 35 | G | 5 | 900 | 60 | 700 | 100 | Example |
| 36 | A | 3 | 900 | 60 | 700 | 100 | Example |
| 37 | A | 90 | 900 | 60 | 700 | 100 | Example |
| 38 | A | 180 | 900 | 60 | 700 | 100 | Example |
| 39 | A | 5 | 830 | 60 | 700 | 100 | Example |
| 40 | A | 5 | 950 | 60 | 700 | 100 | Example |
| 41 | A | 5 | 900 | 5 | 700 | 100 | Example |
| 42 | A | 5 | 900 | 300 | 700 | 100 | Example |
| 43 | A | 5 | 900 | 60 | 650 | 100 | Example |
| 44 | A | 5 | 900 | 60 | 750 | 100 | Example |
| 45 | A | 5 | 900 | 60 | 700 | 50 | Example |
| 46 | A | 5 | 900 | 60 | 700 | 300 | Example |
| 47 | A | 5 | 900 | 60 | 700 | 100 | Comparative example |
| 48 | A | 5 | 900 | 60 | 700 | 100 | Comparative example |
| 49 | A | 5 | 900 | 60 | 700 | 100 | Comparative example |
| 50 | A | 5 | 900 | 60 | 700 | 100 | Comparative example |
| 51 | A | 5 | 900 | 60 | 700 | 100 | Comparative example |
| 52 | A | 5 | 900 | 60 | 700 | 100 | Comparative example |
| 53 | A | 5 | 900 | 60 | 700 | 100 | Comparative example |
| 54 | A | 5 | 900 | 60 | 700 | 100 | Comparative example |
| 55 | A | 5 | 900 | 60 | 700 | 100 | Comparative example |
| 56 | A | 5 | 900 | 60 | 700 | 100 | Comparative example |
| 57 | A | 5 | 900 | 60 | 700 | 100 | Comparative example |
| 58 | B | 5 | 900 | 60 | 700 | 100 | Comparative example |
| 59 | B | 5 | 900 | 60 | 700 | 100 | Comparative example |
| 60 | B | 5 | 900 | 60 | 700 | 100 | Comparative example |
| 61 | B | 5 | 900 | 60 | 700 | 100 | Comparative example |
| 62 | B | 5 | 900 | 60 | 700 | 100 | Comparative example |
| 63 | H | 5 | 900 | 60 | 700 | 100 | Comparative example |
| 64 | I | 5 | 900 | 60 | 700 | 100 | Comparative example |
| 65 | J | 5 | 900 | 60 | 700 | 100 | Comparative example |
| 66 | J | 5 | 900 | 60 | 750 | 500 | Example |
| 67 | K | 5 | 900 | 60 | 700 | 100 | Comparative example |
| 68 | K | 5 | 900 | 60 | 700 | 50 | Example |
| 69 | L | 5 | 900 | 60 | 700 | 100 | Comparative example |
| 70 | A | 5 | 900 | 60 | 700 | 80 | Comparative example |
| 71 | B | 5 | 900 | 60 | 700 | 80 | Comparative example |

TABLE 4

| | Microstructure of cold-rolled steel sheet | | | | | Microstructure of hot-pressed member | | | |
|---|---|---|---|---|---|---|---|---|---|
| Specimen No. | Perlite Volume fraction (%) | Ferrite Volume fraction (%) | Ferrite Average grain size (μm) | Carbonitride smaller than 0.10 μm (counts/100 μm²) | Intergrain distance of Nb and Ti carbonitrides μm | Martensite Volume fraction (%) | Prior austenite Average grain size (μm) | Intergrain distance of Nb and Ti carbonitrides μm | Remarks |
| 1 | 10 | 85 | 5 | 15 | 3 | 98 | 6 | 3 | Example |
| 2 | 12 | 78 | 5 | 15 | 3 | 100 | 5 | 3 | Example |
| 3 | 5 | 84 | 6 | 18 | 2 | 99 | 5 | 3 | Example |
| 4 | 11 | 74 | 6 | 15 | 3 | 97 | 7 | 3 | Example |
| 5 | 15 | 70 | 6 | 15 | 3 | 95 | 6 | 4 | Example |
| 6 | 16 | 80 | 7 | 18 | 4 | 98 | 6 | 5 | Example |
| 7 | 5 | 82 | 6 | 16 | 3 | 98 | 5 | 3 | Example |
| 8 | 15 | 78 | 6 | 17 | 3 | 99 | 6 | 3 | Example |
| 9 | 13 | 80 | 6 | 16 | 5 | 98 | 5 | 3 | Example |
| 10 | 7 | 79 | 7 | 16 | 4 | 99 | 6 | 4 | Example |
| 11 | 9 | 78 | 6 | 17 | 3 | 99 | 6 | 4 | Example |
| 12 | 10 | 81 | 6 | 16 | 3 | 98 | 5 | 3 | Example |
| 13 | 12 | 80 | 6 | 18 | 5 | 99 | 6 | 3 | Example |
| 14 | 15 | 80 | 7 | 16 | 4 | 98 | 7 | 3 | Example |
| 15 | 7 | 89 | 6 | 17 | 3 | 99 | 6 | 3 | Example |
| 16 | 8 | 80 | 7 | 16 | 3 | 99 | 6 | 3 | Example |
| 17 | 8 | 78 | 6 | 17 | 3 | 98 | 6 | 4 | Example |
| 18 | 9 | 78 | 5 | 15 | 3 | 98 | 6 | 3 | Example |
| 19 | 13 | 79 | 6 | 16 | 2 | 97 | 6 | 3 | Example |
| 20 | 12 | 76 | 6 | 17 | 3 | 99 | 7 | 4 | Example |
| 21 | 10 | 78 | 5 | 16 | 4 | 99 | 6 | 5 | Example |
| 22 | 15 | 81 | 6 | 15 | 3 | 98 | 6 | 3 | Example |
| 23 | 13 | 80 | 6 | 18 | 2 | 98 | 6 | 3 | Example |
| 24 | 13 | 81 | 7 | 15 | 3 | 99 | 6 | 4 | Example |
| 25 | 7 | 83 | 6 | 17 | 3 | 99 | 6 | 3 | Example |
| 26 | 9 | 81 | 5 | 15 | 3 | 98 | 6 | 4 | Example |
| 27 | 10 | 80 | 6 | 18 | 3 | 99 | 6 | 3 | Example |
| 28 | 12 | 80 | 6 | 16 | 3 | 98 | 5 | 3 | Example |
| 29 | 15 | 79 | 6 | 18 | 3 | 99 | 6 | 3 | Example |
| 30 | 7 | 80 | 7 | 15 | 2 | 99 | 6 | 3 | Example |
| 31 | 10 | 78 | 6 | 15 | 3 | 98 | 5 | 3 | Example |
| 32 | 15 | 78 | 6 | 18 | 3 | 98 | 6 | 4 | Example |
| 33 | 13 | 79 | 6 | 18 | 2 | 97 | 7 | 4 | Example |
| 34 | 10 | 76 | 6 | 13 | 4 | 99 | 6 | 3 | Example |
| 35 | 7 | 78 | 6 | 15 | 3 | 99 | 6 | 3 | Example |
| 36 | 9 | 78 | 7 | 15 | 3 | 98 | 6 | 3 | Example |
| 37 | 10 | 80 | 6 | 14 | 3 | 98 | 6 | 3 | Example |
| 38 | 9 | 79 | 6 | 15 | 3 | 97 | 6 | 3 | Example |
| 39 | 10 | 78 | 6 | 16 | 4 | 99 | 7 | 4 | Example |
| 40 | 12 | 81 | 7 | 15 | 3 | 99 | 6 | 3 | Example |
| 41 | 15 | 79 | 6 | 13 | 3 | 98 | 6 | 3 | Example |
| 42 | 7 | 76 | 7 | 15 | 3 | 98 | 6 | 4 | Example |
| 43 | 8 | 78 | 6 | 16 | 5 | 99 | 6 | 5 | Example |
| 44 | 7 | 78 | 5 | 13 | 3 | 99 | 6 | 3 | Example |
| 45 | 7 | 80 | 6 | 15 | 3 | 99 | 5 | 3 | Example |
| 46 | 8 | 89 | 6 | 15 | 3 | 99 | 6 | 4 | Example |
| 47 | 18 | 78 | 6 | 5 | 6 | 94 | 9 | 6 | Comparative example |
| 48 | 12 | 70 | 6 | 11 | 7 | 95 | 8 | 6 | Comparative example |
| 49 | 14 | 70 | 8 | 4 | 5 | 99 | 8 | 8 | Comparative example |
| 50 | 10 | 74 | 7 | 6 | 6 | 97 | 7 | 7 | Comparative example |
| 51 | 8 | 87 | 6 | 8 | 6 | 96 | 7 | 8 | Comparative example |
| 52 | 5 | 88 | 6 | 11 | 6 | 98 | 7 | 8 | Comparative example |
| 53 | 11 | 87 | 6 | 12 | 7 | 98 | 9 | 8 | Comparative example |
| 54 | 12 | 80 | 9 | 5 | 7 | 98 | 7 | 7 | Comparative example |
| 55 | 10 | 79 | 6 | 12 | 8 | 99 | 7 | 7 | Comparative example |
| 56 | 13 | 80 | 6 | 10 | 8 | 96 | 8 | 8 | Comparative example |
| 57 | 12 | 72 | 7 | 4 | 8 | 98 | 9 | 4 | Comparative example |
| 58 | 0 | 90 | 8 | 25 | 7 | 98 | 9 | 3 | Comparative example |
| 59 | 36 | 60 | 6 | 2 | 7 | 94 | 9 | 7 | Comparative example |
| 60 | 10 | 90 | 6 | 7 | 7 | 96 | 10 | 34 | Comparative example |
| 61 | 12 | 88 | 7 | 14 | 8 | 97 | 9 | 7 | Comparative example |
| 62 | 13 | 80 | 6 | 11 | 8 | 98 | 7 | 9 | Comparative example |
| 63 | 11 | 80 | 6 | 19 | 6 | 98 | 5 | 22 | Comparative example |
| 64 | 24 | 68 | 7 | 13 | 7 | 99 | 7 | 21 | Comparative example |
| 65 | 11 | 80 | 6 | 15 | 8 | 84 | 6 | 16 | Comparative example |
| 66 | 10 | 80 | 7 | 10 | 5 | 99 | 6 | 5 | Example |
| 67 | 28 | 70 | 6 | 16 | 6 | 98 | 6 | 5 | Comparative example |
| 68 | 8 | 82 | 7 | 10 | 5 | 99 | 6 | 5 | Example |
| 69 | 18 | 71 | 6 | 0 | — | 98 | 6 | — | Comparative example |

TABLE 4-continued

| | Microstructure of cold-rolled steel sheet | | | | | Microstructure of hot-pressed member | | | |
|---|---|---|---|---|---|---|---|---|---|
| Specimen No. | Perlite Volume fraction (%) | Ferrite Volume fraction (%) | Ferrite Average grain size (μm) | Carbonitride smaller than 0.10 μm (counts/100 μm²) | Intergrain distance of Nb and Ti carbonitrides μm | Martensite Volume fraction (%) | Prior austenite Average grain size (μm) | Intergrain distance of Nb and Ti carbonitrides μm | Remarks |
| 70 | 12 | 81 | 8 | 12 | 8 | 98 | <u>9</u> | 5 | Comparative example |
| 71 | 15 | 78 | 8 | 13 | <u>8</u> | 99 | <u>9</u> | 5 | Comparative example |

Underlined if outside of the scope of the disclosure.

TABLE 5

| Specimen No. | Tensile strength TS (MPa) | Indentation peeling strength | Remarks |
|---|---|---|---|
| 1 | 1834 | Good | Example |
| 2 | 1846 | Good | Example |
| 3 | 1865 | Good | Example |
| 4 | 1844 | Good | Example |
| 5 | 1834 | Good | Example |
| 6 | 1822 | Good | Example |
| 7 | 1813 | Good | Example |
| 8 | 1833 | Good | Example |
| 9 | 1818 | Good | Example |
| 10 | 1958 | Good | Example |
| 11 | 1843 | Good | Example |
| 12 | 1822 | Good | Example |
| 13 | 1831 | Good | Example |
| 14 | 1829 | Good | Example |
| 15 | 1827 | Good | Example |
| 16 | 1817 | Good | Example |
| 17 | 1967 | Good | Example |
| 18 | 1848 | Good | Example |
| 19 | 1851 | Good | Example |
| 20 | 1798 | Good | Example |
| 21 | 1810 | Good | Example |
| 22 | 1803 | Good | Example |
| 23 | 1821 | Good | Example |
| 24 | 1984 | Good | Example |
| 25 | 1834 | Good | Example |
| 26 | 1825 | Good | Example |
| 27 | 1826 | Good | Example |
| 28 | 1813 | Good | Example |
| 29 | 1834 | Good | Example |
| 30 | 1841 | Good | Example |
| 31 | 1979 | Good | Example |
| 32 | 1839 | Good | Example |
| 33 | 1870 | Good | Example |
| 34 | 1837 | Good | Example |
| 35 | 1844 | Good | Example |
| 36 | 1834 | Good | Example |
| 37 | 1834 | Good | Example |
| 38 | 1805 | Good | Example |
| 39 | 1822 | Good | Example |
| 40 | 1834 | Good | Example |
| 41 | 1850 | Good | Example |
| 42 | 1820 | Good | Example |
| 43 | 1824 | Good | Example |
| 44 | 1822 | Good | Example |
| 45 | 1831 | Good | Example |
| 46 | 1837 | Good | Example |
| 47 | 1833 | Poor | Comparative example |
| 48 | 1855 | Poor | Comparative example |
| 49 | 1833 | Poor | Comparative example |
| 50 | 1833 | Poor | Comparative example |
| 51 | 1846 | Poor | Comparative example |
| 52 | 1811 | Poor | Comparative example |
| 53 | 1844 | Poor | Comparative example |
| 54 | 1843 | Poor | Comparative example |
| 55 | 1841 | Poor | Comparative example |
| 56 | 1833 | Poor | Comparative example |
| 57 | 1846 | Poor | Comparative example |
| 58 | 1811 | Poor | Comparative example |
| 59 | 1844 | Poor | Comparative example |
| 60 | 1914 | Poor | Comparative example |
| 61 | 1894 | Poor | Comparative example |
| 62 | 1944 | Poor | Comparative example |
| 63 | <u>1567</u> | Poor | Comparative example |
| 64 | 2249 | Poor | Comparative example |
| 65 | <u>1533</u> | Poor | Comparative example |
| 66 | 1842 | Fair | Example |
| 67 | 1854 | Poor | Comparative example |
| 68 | 1881 | Fair | Example |
| 69 | 1821 | Poor | Comparative example |
| 70 | 1844 | Poor | Comparative example |
| 71 | 1836 | Poor | Comparative example |

Underlined if outside of the scope of the disclosure.

As can be seen from Table 5, all of our examples in which the chemical compositions and the microstructures of hot-pressed members satisfy the appropriate ranges of the present disclosure have excellent indentation peeling strength at projection welds, not to mention high tensile strength.

The invention claimed is:

1. A hot-pressed member comprising:
a steel chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities;
a microstructure in which
a prior austenite average grain size is 7 μm or less within a range of 50 μm or less in a thickness direction from a surface of the member, a volume fraction of martensite is 90% or more, an average intergrain distance of Nb and Ti carbonitrides having a grain size of less than 0.10 μm within a depth range of 20 μm to 100 μm in the thickness direction from the surface of the member is 5 μm or less; and
a tensile strength of 1780 MPa or more.

2. The hot-pressed member according to claim 1, wherein the steel chemical composition further contains, by mass %, at least one selected from the group consisting of B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to claim 1, comprising, on a surface layer thereof, an Al or Al alloy coating or plating layer or a Zn or Zn alloy coating or plating layer.

4. A cold-rolled steel sheet for hot pressing, comprising:
a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities; and
a microstructure which contains 30% or less by volume fraction of pearlite, and in which at least 10 Nb and Ti carbonitrides having a grain size of less than 0.10 μm are present on average per 100 μm$^2$ of a cross section parallel to a thickness direction of the steel sheet within a range of 150 μm in the thickness direction from the surface of the steel sheet, and the Nb and Ti carbonitrides have an average intergrain distance of 5 μm or less.

5. The cold-rolled steel sheet for hot pressing according to claim 4, wherein the chemical composition further contains, by mass %, at least one selected from B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

6. The cold-rolled steel sheet for hot pressing according to claim 4, wherein the steel sheet comprises on a surface thereof an Al or Al alloy coating or plating layer or a Zn or Zn alloy coating or plating layer.

7. The hot-pressed member according to claim 2, comprising, on a surface layer thereof, an Al or Al alloy coating or plating layer or a Zn or Zn alloy coating or plating layer.

8. The cold-rolled steel sheet for hot pressing according to claim 5, wherein the steel sheet comprises on a surface thereof an Al or Al alloy coating or plating layer or a Zn or Zn alloy coating or plating layer.

9. A method for manufacturing the cold-rolled steel sheet for hot pressing as recited in claim 4, the method comprising:
preparing a steel raw material comprising a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, Nb: 0.005% or more and 0.15% or less, and Ti: 0.005% or more and 0.15% or less, with the balance being Fe and inevitable impurities;
hot rolling the steel raw material to obtain a hot-rolled steel sheet under a condition of a finisher delivery temperature of 860° C. to 950° C., the hot rolling being started after heating of the steel raw material for 30 minutes or longer at a temperature of 1200° C. or higher;
after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature;
after the primary cooling, subjecting the steel sheet to secondary cooling whereby the steel sheet is coiled at a coiling temperature of 500° C. or lower at a second average cooling rate of 5° C./s to 50° C./s up to the coiling temperature;
then pickling and cold rolling the coiled hot-rolled steel sheet to obtain a cold-rolled steel sheet, and then subjecting the cold-rolled steel sheet to a first annealing whereby the cold-rolled steel sheet is held for 600 seconds or shorter in a temperature range of 850° C. to 950° C. as a soaking temperature, then cooled to room temperature by water cooling, and subjected to 60 seconds to 1800 seconds of tempering in a temperature range of 150° C. to 300° C.; and
after the first annealing, subjecting the steel sheet to a second annealing whereby the steel sheet is heated to a temperature range of 720° C. to 850° C. at an average heating rate of 3° C./s to 30° C./s, held for 15 seconds or longer in a temperature range of 720° C. to 850° C. as a soaking temperature, and cooled to a cooling end temperature of 600° C. or lower at a third average cooling rate of 5° C./s or higher.

10. The method for manufacturing the cold-rolled steel sheet for hot pressing according to claim 9, wherein
the chemical composition further contains, by mass %, at least one selected from the group consisting of B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

11. The method for manufacturing the cold-rolled steel sheet for hot pressing according to claim 9, the method further comprising:
after the second annealing, applying an Al or Al alloy coating or plating treatment or a Zn or Zn alloy coating or plating treatment to a surface of the cold-rolled steel sheet.

12. A method for manufacturing a hot-pressed member, comprising:
heating the cold-rolled steel sheet for hot pressing as recited in claim 4 in a temperature range of an Ac$_3$ transformation temperature to 1000° C.; and
then hot pressing the steel sheet.

13. The method for manufacturing the cold-rolled steel sheet for hot pressing according to claim 10, the method further comprising:
after the second annealing, applying an Al or Al alloy coating or plating treatment or a Zn or Zn alloy coating or plating treatment to a surface of the cold-rolled steel sheet.

14. A method for manufacturing a hot-pressed member, comprising:
heating the cold-rolled steel sheet for hot pressing as recited in claim 5 in a temperature range of an Ac$_3$ transformation temperature to 1000° C.; and
then hot pressing the steel sheet.

15. A method for manufacturing a hot-pressed member, comprising:
heating the cold-rolled steel sheet for hot pressing as recited in claim 6 in a temperature range of an Ac$_3$ transformation temperature to 1000° C.; and
then hot pressing the steel sheet.

16. A method for manufacturing a hot-pressed member, comprising:
heating the cold-rolled steel sheet for hot pressing as recited in claim 8 in a temperature range of an Ac$_3$ transformation temperature to 1000° C.; and
then hot pressing the steel sheet.

* * * * *